(12) United States Patent
Mackel et al.

(10) Patent No.: US 8,758,209 B2
(45) Date of Patent: Jun. 24, 2014

(54) SEPARATOR HAVING A LUBRICATION SYSTEM FOR A SHORT SPINDLE DRIVE

(75) Inventors: Wilfried Mackel, Lippetal-Herzfeld (DE); Thomas Bathelt, Oelde (DE); Andreas Penkl, Lippetal (DE); Andreas Schulz, Beckum (DE); Marie-Theres Sedler, Wadersloh (DE)

(73) Assignee: GEA Mechanical Equipment GmbH, Oelde (DE)

( * ) Notice: Subject to any disclaimer, the term of this patent is extended or adjusted under 35 U.S.C. 154(b) by 983 days.

(21) Appl. No.: 12/747,449

(22) PCT Filed: Nov. 27, 2008

(86) PCT No.: PCT/EP2008/066282
§ 371 (c)(1),
(2), (4) Date: Jun. 10, 2010

(87) PCT Pub. No.: WO2009/074456
PCT Pub. Date: Jun. 18, 2009

(65) Prior Publication Data
US 2010/0273625 A1    Oct. 28, 2010

(30) Foreign Application Priority Data

Dec. 13, 2007  (DE) .......................... 10 2007 060 541

(51) Int. Cl.
| B04B 9/04 | (2006.01) |
| B04B 9/12 | (2006.01) |
| B04B 9/14 | (2006.01) |
| B04B 15/00 | (2006.01) |

(52) U.S. Cl.
USPC .................. 494/15; 494/82; 494/83; 494/84; 184/6.18

(58) Field of Classification Search
USPC .................. 494/1, 12, 16, 20, 82–84, 14–15, 494/60–61; 68/23.1, 23.3; 464/180; 210/144, 363; 74/572, 574; 384/465, 384/473; 184/6.18
See application file for complete search history.

(56) References Cited

U.S. PATENT DOCUMENTS 1,551,140 A  *  8/1925  Edstrom ....................... 451/277
1,745,853 A     2/1930  Krantz
(Continued)

FOREIGN PATENT DOCUMENTS

DE     1 057 979      5/1959
DE     43 14 440      6/1994
(Continued)

OTHER PUBLICATIONS

International Search Report dated Feb. 13, 2007, for International Application No. PCT/EP2008/066282.
(Continued)

Primary Examiner — Charles E Cooley
(74) Attorney, Agent, or Firm — Crowell & Moring LLP

(57) ABSTRACT

A separator including a rotatable centrifugal drum having a vertical axis of rotation and an inflow line for a material to be processed by the separator. Also included is a drive spindle for the drum rotatably mounted via a mounting to a housing supported elastically on a machine stand section. A drive device includes an electric drive motor having a stator and a rotor which is aligned with the drive spindle. A lubricant system is configured to lubricate the mounting and the lubricant system includes a lubricant circuit to convey lubricant and has a lubricant collecting container.

22 Claims, 2 Drawing Sheets

(56) References Cited

U.S. PATENT DOCUMENTS

| | | | |
|---|---|---|---|
| 4,946,433 A * | 8/1990 | Gorodissky et al. | 494/15 |
| 5,051,007 A * | 9/1991 | Maddox et al. | 384/606 |
| 5,848,959 A * | 12/1998 | Droste et al. | 494/15 |
| 6,224,533 B1 * | 5/2001 | Bengtsson et al. | 494/82 |
| 6,228,016 B1 * | 5/2001 | Kristensen et al. | 494/14 |
| 6,267,204 B1 * | 7/2001 | Kristensen et al. | 184/6.16 |
| 6,338,708 B1 * | 1/2002 | Miura et al. | 494/82 |
| 6,354,988 B1 * | 3/2002 | Carson et al. | 494/82 |
| 6,428,460 B1 * | 8/2002 | Appelquist et al. | 494/82 |
| 6,578,670 B1 * | 6/2003 | Klintenstedt et al. | 184/6.16 |
| 6,626,814 B1 * | 9/2003 | Setterberg | 494/15 |
| 6,960,158 B2 * | 11/2005 | Mackel | 494/82 |
| 6,988,980 B2 * | 1/2006 | Moss | 494/15 |
| 7,300,396 B2 * | 11/2007 | Pitkamaki et al. | 494/15 |
| 7,588,526 B2 * | 9/2009 | Kleimann et al. | 494/15 |
| 7,850,590 B2 * | 12/2010 | Mackel et al. | 494/14 |
| 8,092,362 B2 * | 1/2012 | Kohlstette et al. | 494/82 |
| 8,425,394 B2 * | 4/2013 | Skytt et al. | 494/15 |
| 2005/0065010 A1 * | 3/2005 | Moss | 494/15 |
| 2006/0276321 A1 * | 12/2006 | Pitkamaki et al. | 494/15 |
| 2009/0111676 A1 * | 4/2009 | Kleimann et al. | 494/46 |
| 2009/0233780 A1 * | 9/2009 | MacKel et al. | 494/15 |
| 2009/0253565 A1 * | 10/2009 | Kohlstette et al. | 494/12 |
| 2010/0255976 A1 * | 10/2010 | MacKel et al. | 494/15 |
| 2010/0273625 A1 * | 10/2010 | Mackel et al. | 494/15 |
| 2012/0071313 A1 * | 3/2012 | Mackel et al. | 494/11 |

FOREIGN PATENT DOCUMENTS

| | | | |
|---|---|---|---|
| DE | 44 08 182 | 5/1995 | |
| DE | 103 14 110 | 10/2004 | |
| DE | 103 14 118 | 10/2004 | |
| DE | 20 2005 001 539 | 7/2006 | |
| DE | 10 2006 020 467 | 10/2007 | |
| DE | 102007061999 A1 * | 6/2009 | |
| EP | 0 756 897 | 2/1997 | |
| FR | 938 919 | 10/1948 | |
| FR | 1 287 551 | 3/1962 | |
| GB | 2277700 A * | 11/1994 | B04B 9/04 |
| WO | 98/57751 | 12/1998 | |
| WO | 98/57752 | 12/1998 | |
| WO | 2007/125066 | 11/2007 | |

OTHER PUBLICATIONS

Notification of Transmittal of the International Search Report and the Written Opinion of the International Searching Authority, or the Declaration for PCT/EP2008/066282, Filed Nov. 27, 2008.

Written Opinion of the International Searching Authority for PCT/EP2008/066282, Filed Nov. 27, 2008.

* cited by examiner

SEPARATOR HAVING A LUBRICATION SYSTEM FOR A SHORT SPINDLE DRIVE

BACKGROUND OF THE INVENTION

This application is a National Phase Application based upon and claiming the benefit of priority to PCT/EP2008/066282 Application, filed on Nov. 27, 2008, which PCT Application is based upon and claims the benefit of priority to German Patent Application No. 10 2007 060 841.4, filed on Dec. 13, 2007, the contents of both of which applications are incorporated herein by reference.

BACKGROUND OF THE INVENTION

The present disclosure relates to a separator that includes a rotatable centrifugal drum with a vertical axis of rotation and an inflow line for a centrifugable material to be processed. A drive spindle for the centrifugal drum is mounted rotatably by a mounting in a housing which is supported elastically on a machine stand. A drive device includes an electric drive motor having a stator and a rotor which is in alignment with the drive spindle. A lubricant system is configured to lubricate the mounting. The lubricant system includes a lubricant circuit to convey lubricant and has a lubricant collecting container.

Separators of this type, suitable particularly for industrial use in continuous operation, are known per se from the prior art. Among the known systems, there are structures, in which the drum, the drive spindle and the electric drive motor are connected rigidly to form a structural unit which is then supported elastically as a whole on a machine stand. Examples of such prior art are disclosed in FR 1 287 551, DE 1 057 979 and DE 43 14 440 C1.

Moreover, with regard to the technological background, also see WO 98/57751 A1, DE 103 14 118 B4, FR 938 919 A, U.S. Pat. No. 6,428,460 B1 and U.S. Pat. No. 1,745,853 A.

DE 20 2005 001 539 U1 shows a separator having a drive belt, with a circulatory lubrication system for lubricating the spindle mounting. The system has a tube-like device, resembling a paring disk, for pumping away lubricant. The device serves for pumping lubricant, which emerges from the mounting of the drive spindle of the separator drive, via a treatment assembly into a lubricant sump, into which the drive spindle, designed as a hollow spindle, penetrates with its lower end. However, this arrangement still has a relatively long axial length.

WO 2007/125066 A1 discloses a generic separator with a direct drive. The drive device has an electric drive motor with a stator and a motor rotor which is in alignment with the drive spindle, the stator being connected rigidly to the machine stand, and the motor rotor, drive spindle, centrifugal drum and housing forming a unit which is supported elastically on the machine stand and which oscillates during operation. In this case, the bearing device is arranged between the motor and the drum. Furthermore, it is proposed therein to accommodate the lubrication of the bearing devices above a partition over the drive motor.

Against this background, the present disclosure relates to, among other things, to improving further the set-up and arrangement of the lubrication system of separators having a vertical axis of rotation.

The present disclosure thus relates to an embodiment comprising a separator that includes a rotatable centrifugal drum having a vertical axis of rotation and an inflow line for a material to be processed by the separator. Further included is a drive spindle for the drum rotatably mounted via a mounting to a housing supported elastically on a machine stand section. A drive device includes an electric drive motor having a stator and a rotor which is aligned with the drive spindle. A lubricant system is configured to lubricate the mounting. The lubricant system includes a lubricant circuit to convey lubricant and has a lubricant collecting container. The entire lubricant circuit and at least the lubricant collecting container is arranged axially above the rotor. The lubricant is conveyed out of the lubricant collecting container directly through a lubricant duct formed in the housing and extending into a region of or above a neck bearing of the mounting. The entire mounting of the drive spindle is arranged axially above a bottom of the lubricant collecting container. Another embodiment comprises a separator that includes a centrifugal drum having a vertical axis of rotation and an inflow line for a material to be processed by the separator. Further included is a drive spindle for the drum rotatably mounted via a mounting to a housing supported elastically on a machine stand section. A drive device includes a motor and a drive belt looping around the drive spindle. The entire mounting is arranged above the motor or the drive belt. A lubricant system is configured to lubricate the mounting and includes a lubricant circuit and has a lubricant collecting container. The entire lubricant circuit and at least the lubricant collecting container is arranged axially above one or both of a belt pulley or the drive belt that surrounds the drive spindle. The entire mounting of the drive spindle is arranged axially above a bottom of the lubricant collecting container.

This arrangement makes it possible to implement a form of construction of the drive device which is especially short in the vertical direction. Since the spindle is not used for lubricant circulation, it can be utilized for other tasks, such as a product supply, for example through a hollow spindle.

As noted above, the structures are suitable both for drive via a belt mechanism and for various types of direct drives with a drive motor arranged in an axial prolongation of the drive spindle or on the drive spindle.

The region of the motor can be separated in structural terms from elements of the lubricant system.

Moreover, the oil is conveyed in a confined space, directly in or sometimes also directly on the housing, to the neck bearing.

Moreover, the co-rotating lubricant collecting container affords an advantage that it can receive a relatively large oil volume in a confined space. That means, for the conveyance of oil, for example, a conveying member, resembling a paring disk, for the pumping of oil or a conveying tube for conveying into the mounting, can be integrated into said collecting container.

Other aspects of the present disclosure will become apparent from the following descriptions when considered in conjunction with the accompanying drawings.

DETAILED DESCRIPTION

Figure 1:
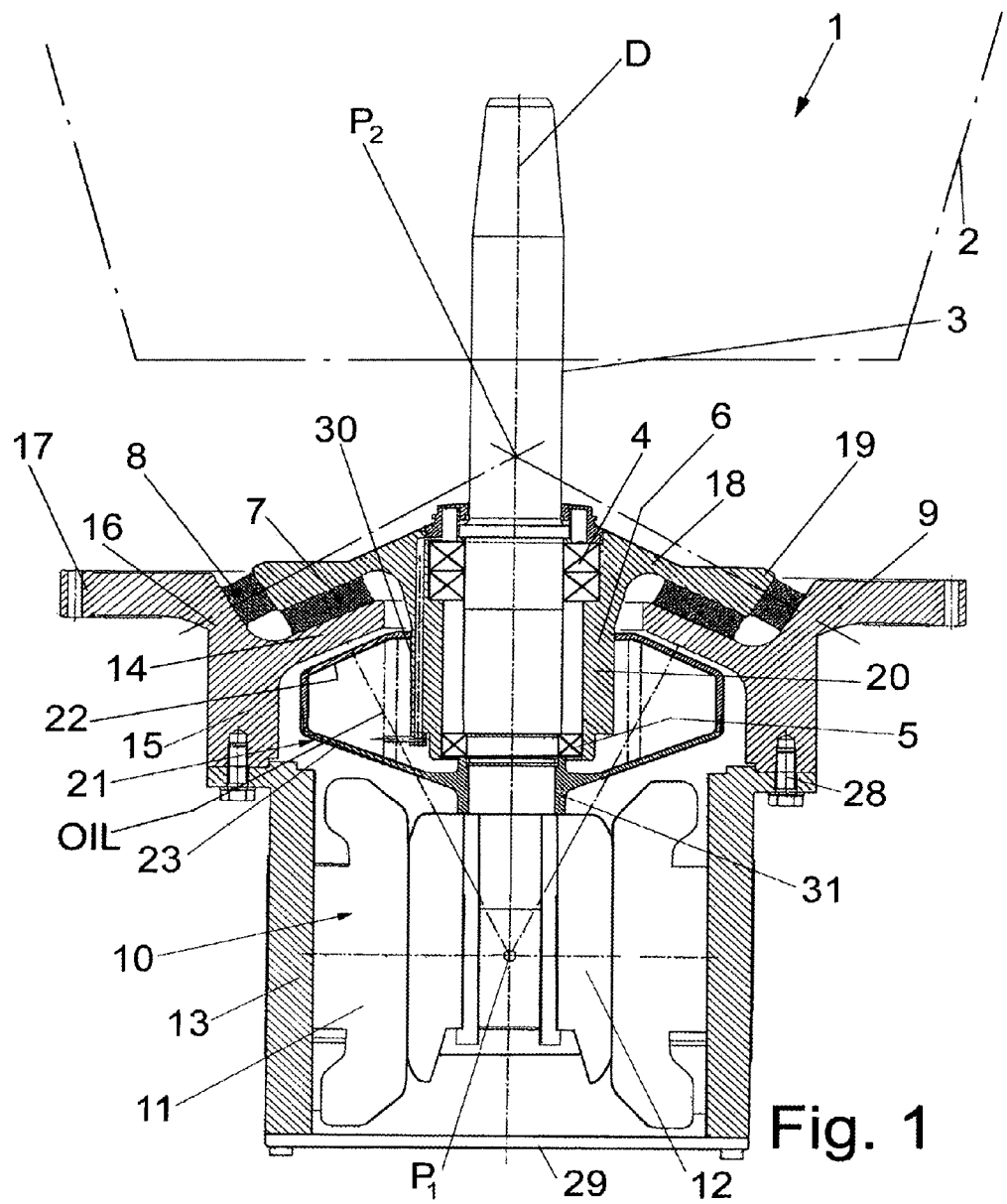
FIG. 1 shows a sectional view of a first separator drive, according to the present disclosure.

FIG. 1 shows a part of a separator 1 including a centrifugal drum 2 indicated by broken lines and having a vertical axis of rotation D. The centrifugal drum 2 is connected to a drive spindle 3. A cowl and a solids trap are not shown.

The drive spindle 3 is mounted rotatably in a housing 6 by a mounting. The mounting comprises a neck bearing 4, or upper bearing, and a foot bearing 5 or lower bearing. For example, the neck bearing 4 includes two rolling bearings. It is within the scope of the present disclosure that other configurations, for example, with only one rolling bearing as a neck bearing 4 is conceivable (not shown). Furthermore, it is also be conceivable to provide two foot bearings 5.

The housing 6 is supported on a machine stand section 9 by one or more elastic elements 7, 8, for example, round bearings. The machine stand section 9 may be designed, for example, as part of an overriding machine stand or may be fastened to a ceiling of a building.

A separator drive serves for driving the centrifugal drum 2. As shown in FIG. 1, the drive includes an electric motor 10 which has a motor housing 13 with a stator 11, or stator winding, and a motor rotor 12. The motor 10 may have a variety of mountings, thus making it possible to have more cost-effective designs.

The drive spindle 3 is connected to the motor rotor 12 directly. That is, without interposed elements, such as a coupling. By contrast, the motor housing 13 with the stator 11 is arranged rigidly, unsprung, on the machine stand section 9. The motor housing 13 is directly attached, for example, screwed on by bolts 28 to the machine stand section 9 at the bottom. The motor housing 13 has a lower cover 29. For ventilation, orifices and/or a fan may be introduced (not shown) into the cover 29.

The mounting, or bearing devices 4, 5, is arranged axially between the motor 11 and the centrifugal drum 2.

The motor rotor 12 is thus arranged, suspended with respect to the drive spindle 3, in a simple and advantageous way.

Separate bearings on the motor 10, for implementing a rigid positioning of the motor rotor 12 with respect to the stator 11 of the motor 10, are dispensed with.

The motor rotor 12, which executes the oscillation and movement of the drive spindle 3 in accompaniment, can rotate freely in the stator 11, without touching it.

The elastic elements 7, 8 comprise, distributed circumferentially, a plurality of elements, such as, for example, round bearings which may be oriented perpendicularly to one another. This results in an especially defined setting of the point of articulation or center of rotation of the system P1.

The arrangement of the pairs of elastic elements 7, 8 is selected in such a way that straight lines running through longitudinal mid-axes of the first elastic elements 7 intersect at the point P1 which lies axially and radially in the middle, within the motor rotor 13, on the axis of the rotation D of the drive spindle 3. The selected arrangement affords the advantage of a good and easy coordination of the spring properties by a variation in the location and design of the first elastic elements 7.

The second elastic elements 8 are arranged radially outside the first elastic elements 7. Straight lines running through their longitudinal mid-axes intersect on the axis of rotation D at a point P2 which lies above the mounting, or bearing devices 4, 5 and lies within the drive spindle 3.

The separator drive, according to the present disclosure, is designed in a defined way such that the center of rotation P1 of the oscillating unit lies in the axially and radially middle third, or, for example, at the axial and radial mid-point, of the motor rotor 12.

The machine stand section 9 has a radially inner wall section 14 which tapers conically upward and which merges downwardly into a wall section 15 extending cylindrically vertically downward. The motor housing 13 is attached to this cylindrical wall section 15 at the bottom. The cylindrical wall section 15 merges upwardly and radially outwardly into a conically widening wall section 16 which merges in turn into a radially outer flange section 17. A solids trap and a cowl, in accordance with the present disclosure, also being capable of being supported on the machine stand 9.

The housing 6 has an upper flange-like region which has a wall section 18 widening outwardly and downwardly and, adjoining said wall section 18 radially outwardly is a wall section 19 widening outwardly perpendicularly with respect to the section 18. The housing 6 is consequently designed to be stable and yet stiff and with optimized weight.

The top sides of the wall sections 14 and 15 serve lower supporting surfaces, and the undersides of the wall sections 18, 19 serve as upper supporting surfaces of the first and second elastic elements 7 and 8 which are oriented perpendicularly with respect to one another.

The flange-like region or wall section 18 has adjoining it a cylindrical housing region 20 which extends axially downwardly and which surrounds the drive spindle 3. The neck and foot bearings 4, 5 are arranged, spaced apart, between the inner circumference of the housing 6 and the outer circumference of the drive spindle 3.

Figure 2:
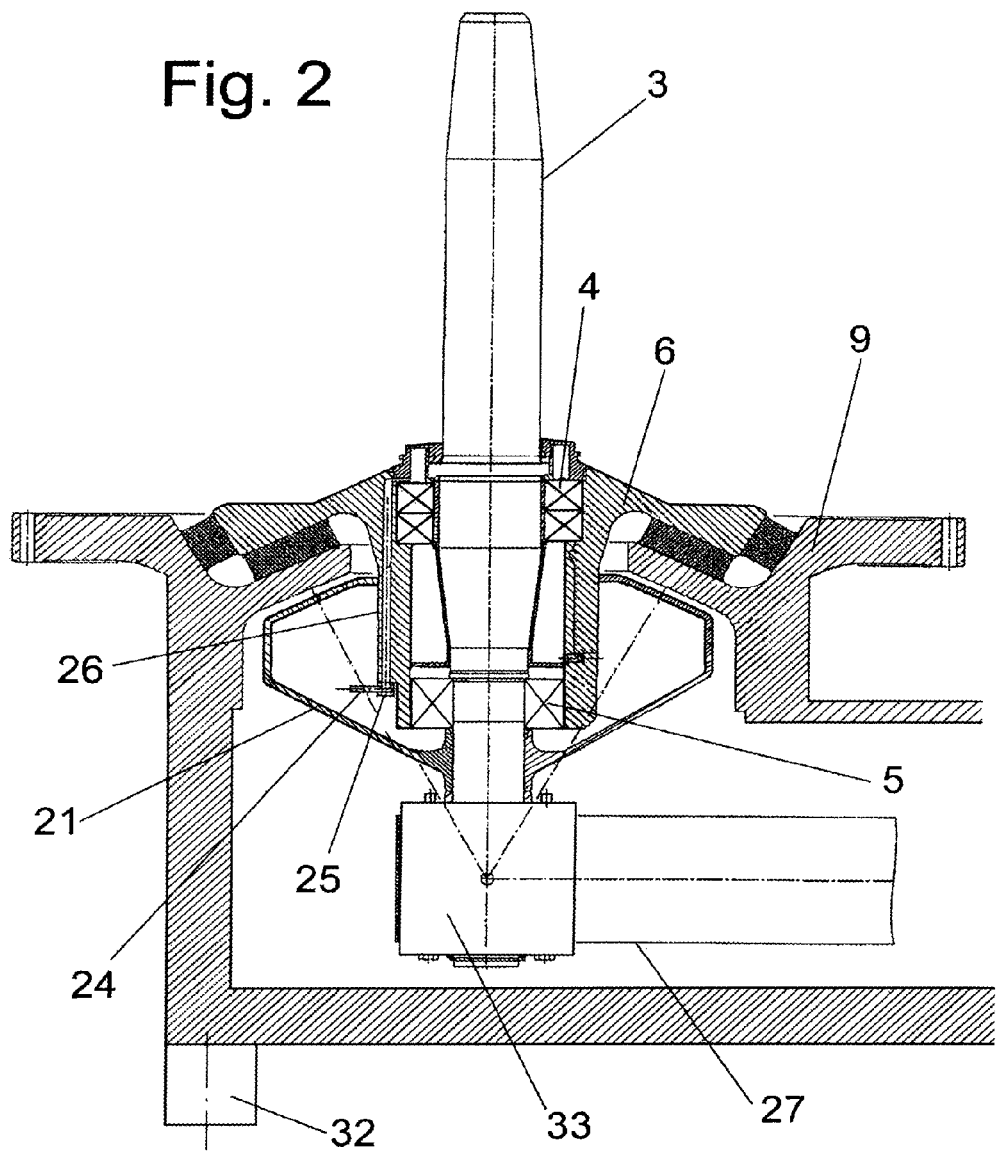
FIG. 2 shows a sectional view of a second separator drive, according to the present disclosure.

In the space delimited upwardly and radially outwardly by the machine stand section 9 and downwardly by the rotor 12 of the motor 10, and also inwardly by the housing region 20, and, further below, by the drive spindle 3, an annular-space or torus-like lubricant collecting container 21 is arranged. Container 21 has boundary walls 22, 23 tapering upwardly and downwardly. Furthermore, as shown in FIGS. 1 and 2, the lubricant collecting container 21 is connected fixedly in terms of rotation in its lower region to the drive spindle 3, for example, in region 31. Thus, during operation, oil is collected in it radially on the outside. The lubricant collecting container 21 bears upwardly, with an extension 30 extending partially parallel to the housing 6 and against the housing 6 in a virtually sealing arrangement. However, the container 21 is rotatable in relation to said housing 6.

The lubricant collecting container 21 can, in accordance with the present disclosure, be integrated predominantly as a co-rotating element into the structure. Nonetheless, container 21 may advantageously have a large volume.

The rotating lubricant collecting container 21 also affords an advantage that heat can easily be diverted outward by it, for example via cooling ribs. A means for surface enlargement, such as the cooling ribs, can also be integrated into the container 21 or on the outside of the container 21, in accordance with the present disclosure.

Furthermore, for cooling, for example, the lower cover 29 could have one or more orifices, and a further orifice could be provided in the region of the housing 6 or machine stand section 9, above the motor 10, so that, during operation, an air stream past the motor 10 occurs in the manner of a fan. In the cover 29, a diameter would be selected for the orifices which diameter is smaller than the outside diameter of the collecting container 21, in order to achieve the fan-like cooling action. A ribbing on the collecting container 21, for example at the bottom, would further reinforce this effect.

It is within the scope of the present disclosure to integrate a cooling circuit for a fluid into the motor housing 13 or at another suitable location.

In an advantageous refinement, a tube-like extension 24 projects as a means for the conveyance of oil into the lower region of the lubricant collecting container 21 and is arranged and designed in such a way that, during operation, it penetrates into the lubricant, for example an oil, collected in the lubricant collecting container 21 on the outside. The extension 24 projects into a radial bore 25 in the housing 6, which bore 25 merges into a lubricant duct 26 extending axially into the region above the neck bearing 4. This arrangement, resembling a paring disk, serves for conveying the lubricant out of the lubricant collecting container 21 into the region between the inner circumference of the housing 6 and the outer circumference of the drive spindle 3, above the neck bearing 4.

For better guidance, the tube 24 may also be bent opposite to the direction of rotation.

During rotations of the drive spindle 3, oil is routed outward and is pumped upward through the lubricant duct 26 at the oil level designated as OIL in FIG. 1.

Lubricant emerging from the lubricant duct 26 can then run downwardly through the neck and the foot bearings 4, 5 and from there downwardly back into the lubricant collecting space 21, where it collects radially on the outside on account of the centrifugal action.

By way of the lubricant duct 26, oil can be conveyed out of the lubricant collecting container 21 through the lubricant duct 26, which is formed in the housing 6 and extends directly into or above the neck bearing 4, passes axially through the housing 6, directly into the region of the neck bearing 4 on or into the region above the neck bearing 4. In accordance with the present disclosure, the oil no longer, as in WO 2007/125066, has to be routed through external lines or filter elements out of the region lying radially near the drive spindle 3.

Thus, a complete lubricant circuit designed in a defined way and operating reliably is implemented in a most confined space for the purpose of lubricating the mounting, or the neck and foot bearing 4, 5, of the centrifuge or separator 1. The region of the drive motor 10 is separated from the lubricant system or lubricant circuit. The drive region beneath the mounting 4, 5 has only a minimal vertical extent.

In an embodiment according to the present disclosure, the motor rotor 12 is connected fixedly in terms of rotation directly to the drive spindle 3 or is formed in one piece with the latter. Elements, such a coupling, which lengthen the form of construction, may thus be dispensed with. Moreover, the production costs are also further reduced.

It is within the scope of the present disclosure to provide other types of motors on the spindle 3. Thus, it is conceivable to connect the motor rotor 12 to the spindle 3 and the stator 11 to the housing 6 (not shown).

As shown in FIG. 2, the lubricant circuit of FIG. 1, with all its elements, may also be employed in a structure in which the drive spindle 3 is driven via a drive belt 27 lying beneath the lubricant collecting container 21. This embodiment of separator construction, which is an especially compact form of construction, including, for example, being short in the vertical direction is implementable using the lubricant system according to the present disclosure.

The annular-space/torus-like lubricant collecting container 21 is arranged in the space delimited upwardly and radially outwardly by the machine stand section 9 and downwardly by the drive belt 27 and also inwardly by the housing region 20 and, further below, by the drive spindle 3. The lubricant collecting container 21 can also be integrated predominantly into the structure at this point. FIG. 2 also shows a machine stand foot 32 and belt pulley 33 which the drive belt 27 surrounds or with which the latter may be formed integrally.

The separator drive, according to the embodiment of FIG. 2, is designed in such a way that the center of rotation P1 of the oscillating unit lies at the axial and radial mid-point of that region of the belt pulley 33 on the drive spindle 3 around which the drive belt 27 is looped.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A separator comprising:
   a rotatable centrifugal drum having a vertical axis of rotation and an inflow line for a material to be processed by the separator;
   a drive spindle for the drum rotatably mounted via a mounting to a housing supported elastically on a machine stand section, the mounting including a housing having a first and a second bearing;
   a drive device including an electric drive motor having a stator and a rotor which is aligned with the drive spindle;
   a lubricant system configured to lubricate the mounting, the lubricant system including a lubricant circuit to convey lubricant and a lubricant collecting container, the entire lubricant circuit and at least the lubricant collecting container being arranged axially above the rotor;
   the lubricant being conveyed out of the lubricant collecting container directly through a lubricant duct formed in the housing and extending into a region of or above a neck bearing of the mounting; and
   wherein the entire mounting of the drive spindle being arranged axially above a bottom of the lubricant collecting container.

2. The separator as claimed in claim 1, wherein the stator is connected rigidly to the machine stand and the rotor, the drive spindle, the centrifugal drum and the housing form a unit which is supported elastically on the machine stand section and which oscillates during operation.

3. The separator as claimed in claim 1, wherein the lubricant collecting container surrounds the drive spindle.

4. The separator as claimed in claim 1, wherein the lubricant collecting container is of a single-conical design.

5. The separator as claimed in claim 1, wherein the lubricant collecting container rotates with the drive spindle during an operation of the separator.

6. The separator as claimed in claim 1, wherein the first bearing is an upper neck bearing and the second bearing is a lower foot bearing.

7. The separator as claimed in claim 1, wherein the housing is supported on the machine stand section by at least one elastic element.

8. The separator as claimed in claim 7, wherein the at least one elastic element is distributed circumferentially as a plurality of paired arrangements including two elastic elements which are oriented perpendicularly to one another.

9. The separator as claimed in claim 8, wherein the paired arrangement of the elastic elements is selected such that straight lines running through the longitudinal mid-axes of a first of the elastic elements intersect at a point which lies axially in the middle, within the rotor on the axis of rotation.

10. The separator as claimed in claim 9, wherein the arrangement of a second of the elastic elements is arranged such that straight lines running through their longitudinal mid-axes intersect on the axis of rotation, within the drive spindle, and at a point lying above the mounting.

11. The separator as claimed in claim 1, wherein the drive device is configured such that a center of rotation of an oscillating unit lies at an axial and radial mid-point of the rotor.

12. The separator as claimed in claim 1, wherein the machine stand section includes a radially inner first wall section which tapers conically upward and which merges downwardly into a second wall section extending cylindrically vertically downward.

13. The separator as claimed in claim 12, wherein a motor housing is attached to the cylindrical second wall section at a bottom area of the second wall section.

14. The separator as claimed in claim 13, wherein the cylindrical second wall section merges radially upwardly and outwardly into a conically widening section which merges in turn into a radially outer flange section.

15. The separator as claimed in claim 12, wherein the housing includes an upper flange-like region which has a first flange wall section widening outwardly and downwardly and a second flange wall section, adjoining the first flange wall section radially outwardly, the second flange wall section widening upwardly, and the conical and cylindrical wall sections are lower supporting surfaces and the flanged wall sections are upper supporting surfaces of the first and second elastic elements oriented perpendicularly to one another.

16. The separator as claimed in claim 15, wherein the first flange wall section is adjoined to a cylindrical housing region which extends axially downwardly and which surrounds the drive spindle, and the neck bearing and a foot bearing of the mounting are distributed between an inner circumference of the housing and an outer circumference of the drive spindle.

17. The separator as claimed in claim 16, wherein the lubricant collecting container is arranged in a space delimited upwardly and radially outwardly by the machine stand section and downwardly by the drive motor, inwardly by the housing region and, further below by the drive spindle.

18. The separator as claimed in claim 1, wherein the lubricant collecting container is connected fixedly to the drive spindle.

19. The separator as claimed in claim 1, wherein a conveying member of the lubricant system penetrates the lubricant collecting container.

20. The separator as claimed in claim 1, wherein an extension or one end of a lubricant duct extending axially into a region above a neck bearing of the mounting penetrates into the lubricant collecting container and serves as a conveying member for conveying the lubricant out of the lubricant collecting container in the manner of a paring disk into a region between an inner circumference of the housing and an outer circumference of the drive spindle, above the mounting, from where it runs downwardly through the mounting and from there downwardly back into the lubricant collecting container.

21. The separator as claimed in claim 1, wherein the lubricant collecting container surrounds the drive spindle in a torus-like manner.

22. The separator as claimed in claim 1, wherein the lubricant collecting container is of a double-conical design.

* * * * *